United States Patent
Kristiansson et al.

(10) Patent No.: US 11,541,893 B2
(45) Date of Patent: Jan. 3, 2023

(54) FRICTION ESTIMATION

(71) Applicant: Nira Dynamics AB, Linköping (SE)

(72) Inventors: Gustav Kristiansson, Vreta Kloster (SE); Tobias Hammarling, Linköping (SE); Per Magnusson, Linköping (SE)

(73) Assignee: Nira Dynamics AB, Linköping (SE)

( * ) Notice: Subject to any disclaimer, the term of this patent is extended or adjusted under 35 U.S.C. 154(b) by 0 days.

(21) Appl. No.: 16/650,822

(22) PCT Filed: Sep. 26, 2018

(86) PCT No.: PCT/EP2018/076063
§ 371 (c)(1),
(2) Date: Mar. 25, 2020

(87) PCT Pub. No.: WO2019/063589
PCT Pub. Date: Apr. 4, 2019

(65) Prior Publication Data
US 2020/0231163 A1 Jul. 23, 2020

(30) Foreign Application Priority Data
Sep. 26, 2017 (SE) .................................... 1751192-4

(51) Int. Cl.
*B60W 40/068* (2012.01)
*B60W 30/18* (2012.01)
*B60W 50/00* (2006.01)

(52) U.S. Cl.
CPC .... *B60W 40/068* (2013.01); *B60W 30/18172* (2013.01); *B60W 2050/0028* (2013.01); *B60W 2420/42* (2013.01); *B60W 2552/40* (2020.02)

(58) Field of Classification Search
CPC .... B60W 40/02; B60W 40/06; B60W 40/064; B60W 40/068; B60W 2420/40;
(Continued)

(56) References Cited

U.S. PATENT DOCUMENTS

| 6,549,842 B1 | 4/2003 | Hac et al. | |
| 6,597,980 B2 * | 7/2003 | Kogure | B60W 40/10 |
| | | | 701/80 |

(Continued)

FOREIGN PATENT DOCUMENTS

| CN | 105584485 A | 5/2016 |
| DE | 10 2015 119495 A1 | 5/2016 |

(Continued)

*Primary Examiner* — Russell Frejd
*Assistant Examiner* — Brandon Z Willis
(74) *Attorney, Agent, or Firm* — Faegre Drinker Biddle & Reath LLP

(57) ABSTRACT

A system for estimating the friction between a road surface and a tire of a vehicle includes at least one first sensor and at least one vehicle processing device containing a friction estimation algorithm which is arranged to estimate the friction between the road surface and the tire of the vehicle based on friction related measurements is provided. The vehicle processing device is arranged to: receive an estimate of the expected friction between the road surface and the tire of the vehicle from a central processing device, from a storage device in the vehicle, or from at least one second sensor in the vehicle; adapt the friction estimation algorithm based on said received estimate of the expected friction; receive at least one friction related measurement from the at least one first sensor in the vehicle; and use the adapted friction estimation algorithm to perform an estimation of the friction between the road surface and the tire of the vehicle based on the at least one friction related measurement.

16 Claims, 4 Drawing Sheets

(58) Field of Classification Search
CPC ....... B60W 2420/403; B60W 2420/42; B60W 30/18172; B60W 2050/0028; B60W 2530/20; B60W 2552/20; B60W 2552/35; B60W 2552/40; B60W 2555/20; B60W 2556/10
See application file for complete search history.

(56) References Cited

U.S. PATENT DOCUMENTS

| | | |
|---|---|---|
| 8,666,562 B2 | 3/2014 | Tuononen |
| 9,139,204 B1 | 9/2015 | Zhao et al. |
| 9,475,500 B2 * | 10/2016 | Grimm ................ G08G 1/0133 |
| 9,815,476 B2 * | 11/2017 | Lynch ................ B60W 40/064 |
| 2002/0007661 A1 * | 1/2002 | Takahashi ............... B60T 8/172 |
| | | 73/9 |
| 2013/0253795 A1 | 9/2013 | Brueggemann et al. |
| 2015/0224925 A1 * | 8/2015 | Hartmann ................ B60R 1/00 |
| | | 348/148 |
| 2015/0251659 A1 | 9/2015 | Fischer et al. |
| 2020/0089243 A1 * | 3/2020 | Poeppel ............ B60W 50/0097 |

FOREIGN PATENT DOCUMENTS

| | | |
|---|---|---|
| EP | 1 207 089 A2 | 5/2002 |
| EP | 1558456 A1 | 8/2005 |
| EP | 1558456 B1 | 5/2007 |
| WO | 2004/039621 A1 | 5/2004 |
| WO | 2017/102086 A1 | 6/2017 |

\* cited by examiner

FRICTION ESTIMATION

CROSS-REFERENCE TO PRIOR APPLICATIONS

This application is a § 371 National Stage Application of PCT International Application No. PCT/EP2018/076063 filed Sep. 26, 2018, which claims priority to Swedish Application No. 1751192-4 filed on Sep. 26, 2017, both of which are incorporated herein in their entirety.

TECHNICAL FIELD

The present disclosure relates generally to systems and methods for estimating the friction between a road surface and a tire of a vehicle.

BACKGROUND

Systems that provide vehicles with friction information may be used to increase road safety for conventional vehicles, but will become increasingly important with the introduction of autonomously driving vehicles. If a vehicle has information about the friction on the road, warnings can be given to the driver/vehicle, and the driver/vehicle can adapt, e.g. by adapting automatic braking systems in the vehicle to the friction on the road.

U.S. Pat. No. 8,666,562 describes a method for the estimation of a maximum friction between a vehicular tire and a road surface via driving dynamics measurements.

EP1558456 describes a method for determining friction between a surface and a tire of a driven wheel in a wheeled vehicle.

US20150251659 describes a method for performing proactive estimation of the friction coefficient using both camera and wheel friction coefficients. The friction coefficient is estimated to the camera friction coefficient, which is continuously checked for plausibility using the wheel friction coefficient.

US2015224925 describes a method for determining a state of a pavement from sensor data, in which method locally measured friction coefficients may be assigned to individual image sectors of a camera image from a forward facing camera.

PROBLEMS WITH THE PRIOR ART

Locally measured friction coefficients may be very accurate, but the information they provide is generally available too late to be useful for adapting the systems within the vehicle to the friction. The solution proposed in e.g. US20150251659 is to estimate the friction based on images from a forward facing camera, and validate it using input from the locally measured friction. However, even with such improvements, any camera based friction estimation is unlikely to be very accurate.

There is thus a need for an improved friction estimation system.

SUMMARY

Since the use of a friction estimation algorithm to estimate the local friction based on measurements from sensors such as rotational speed sensors is established and reliable technology, it is advantageous to base the friction estimation on the use of such a friction estimation algorithm. It is thus proposed to do this, but to improve the algorithm based on other friction estimations, such as e.g. camera based friction estimations. This mitigates the disadvantage that local friction information based on measurements from sensors such as rotational speed sensors may be available too late, while still keeping the accuracy and reliability of the friction estimation algorithms.

The described problem is thus addressed by the claimed system for estimating the friction between a road surface and a tire of a vehicle comprising at least one first sensor and at least one vehicle processing device containing a friction estimation algorithm which is arranged to estimate the friction between the road surface and the tire of the vehicle based on friction related measurements. The vehicle processing device may be arranged to: receive an estimate of the expected friction between the road surface and the tire of the vehicle, e.g. from a central processing device, from a storage device in the vehicle, or from at least one second sensor in the vehicle, such as e.g. a camera; adapt the friction estimation algorithm based on said received estimate of the expected friction; receive at least one friction related measurement from the at least one first sensor in the vehicle; and use the adapted friction estimation algorithm to perform an estimation of the friction between the road surface and the tire of the vehicle based on the at least one friction related measurement.

The described problem is further addressed by the claimed method for estimating the friction between a road surface and a tire of a vehicle comprising at least one first sensor and at least one vehicle processing device containing a friction estimation algorithm which is arranged to estimate the friction between the road surface and the tire of the vehicle based on friction related measurements. The method may comprise: obtaining an estimate of the expected friction between the road surface and the tire of the vehicle, e.g. from a central processing device, from a storage device in the vehicle, or from at least one second sensor in the vehicle, such as e.g. a camera; adapting the friction estimation algorithm based on said obtained estimate of the expected friction; performing at least one friction related measurement using the at least one first sensor in the vehicle; and using the adapted friction estimation algorithm to perform an estimation of the friction between the road surface and the tire of the vehicle based on the at least one friction related measurement.

This enables the friction estimation algorithm to always be as stable and dependable as possible, while still reacting fast when conditions change. This also enables an easy calibration of the friction estimation algorithm.

In embodiments, if said received/obtained estimate of the expected friction is an indication of a potential sudden change in friction, the sensitivity of the friction estimation algorithm is increased. This enables the friction estimation algorithm to react quickly to potential friction changes that may be detected before the vehicle reaches the point of friction change.

In embodiments, if said received/obtained estimate of the expected friction is an indication of a potential sudden change in friction, the vehicle processing device is arranged to determine the point in time when the vehicle is expected to reach the position on the road surface for which said potential sudden change in friction is indicated, and increase the sensitivity of the friction estimation algorithm at this point in time. This enables the sensitivity of the friction estimation algorithm to be increased at the right moment.

In embodiments, if said received/obtained estimate of the expected friction is an indication of no change in friction, the sensitivity of the friction estimation algorithm is decreased, so that any fluctuations in the at least one friction related measurement may be ignored in such situations. This increases the stability and consistency of the friction estimation.

In embodiments, the vehicle further comprises at least one camera, which may e.g. be forward facing, and said received/obtained estimate of the expected friction is based on image data from the at least one camera.

In embodiments, said received/obtained estimate of the expected friction is a previously estimated friction coefficient for the road surface. The previously estimated friction coefficient for the road surface may e.g. be received/obtained from a central processing device, or from a storage device in the vehicle. The vehicle processing device may e.g. be arranged to determine at least one parameter of the friction estimation algorithm based on the previously estimated friction coefficient for the road surface. The vehicle processing device may e.g. be arranged to calculate a preliminary value of a property of the tire of the vehicle based on the assumption that the friction coefficient has not changed from the previously estimated friction coefficient for the road surface. This enables an easy calibration of the friction estimation algorithm.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

A friction estimation algorithm may estimate the friction based on friction related measurements from sensors in the vehicle. Such an algorithm needs to react very quickly in order for the driver/vehicle to be able to adapt to changes in friction. Accurate friction estimation may be speeded up if an estimate of the expected friction, such as e.g. information about a potential sudden change in friction, is used to adapt the friction estimation algorithm to the expected friction.

The friction between a road surface and a tire of a vehicle may be estimated in a number of different ways, but accurate friction estimations often use one or more properties of the tire of the vehicle in the estimation. Such a property may e.g. be the wheel radius, as described e.g. in EP1558456. Before the one or more properties of the tire have been determined, it may not be possible to accurately estimate the friction between the road surface and the tire without calibrating the friction estimation algorithm. The calibration process may be speeded up if an expected friction, e.g. a previously estimated friction coefficient for the road surface, can be used to calculate a preliminary value of the one or more properties of the tire of the vehicle based on the assumption that the friction has not changed from the previously estimated friction coefficient.

The present disclosure relates generally to systems and methods for estimating the friction between a road surface and a tire of a vehicle. Embodiments of the disclosed solution are presented in more detail in connection with the figures.

Figure 1:
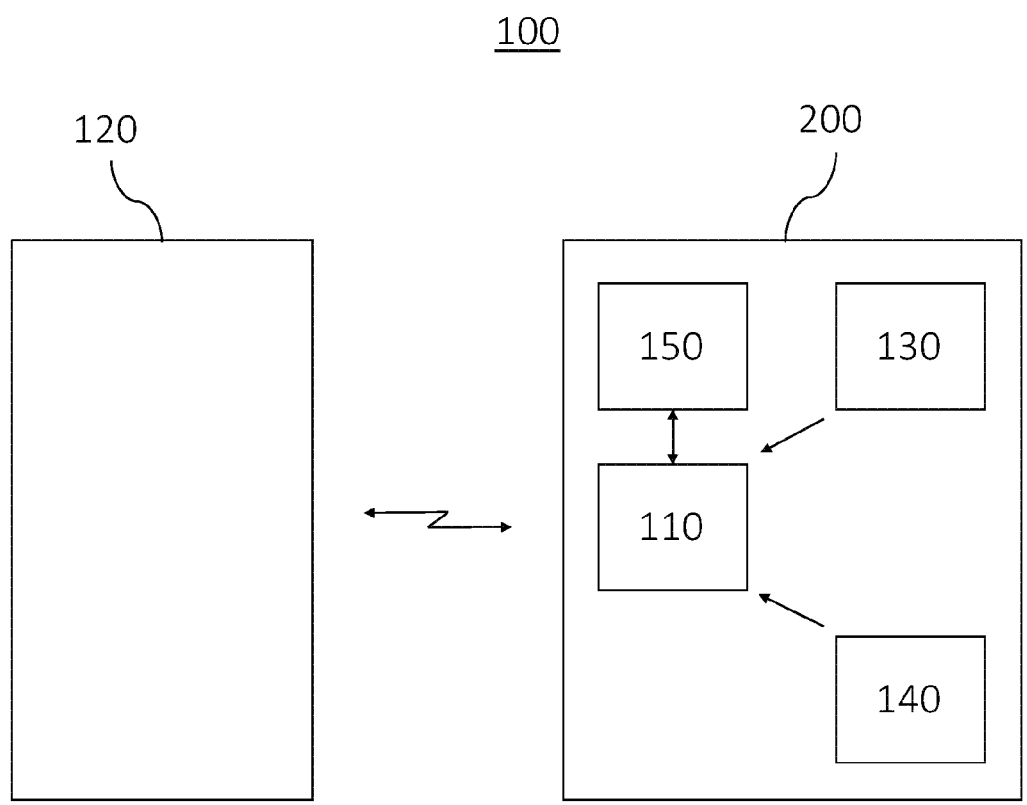
FIG. 1 schematically illustrates a system for estimating the friction between a road surface and a tire of a vehicle, in accordance with one or more embodiments described herein.

FIG. 1 schematically illustrates a system 100 for estimating the friction between a road surface 300 and a tire of a wheel 210 of a vehicle 200, in accordance with one or more embodiments described herein. The vehicle 200 may comprise at least one vehicle processing device 110 containing a friction estimation algorithm, which is arranged to estimate the friction between the road surface and the tire based on friction related measurements. The friction estimation algorithm may e.g. estimate the friction based on friction related measurements from at least one first sensor 130 in the vehicle. The vehicle 200 shown in FIG. 1 further comprises a forward facing camera 140. The system 100 may also comprise a central processing device 120.

Figure 2:
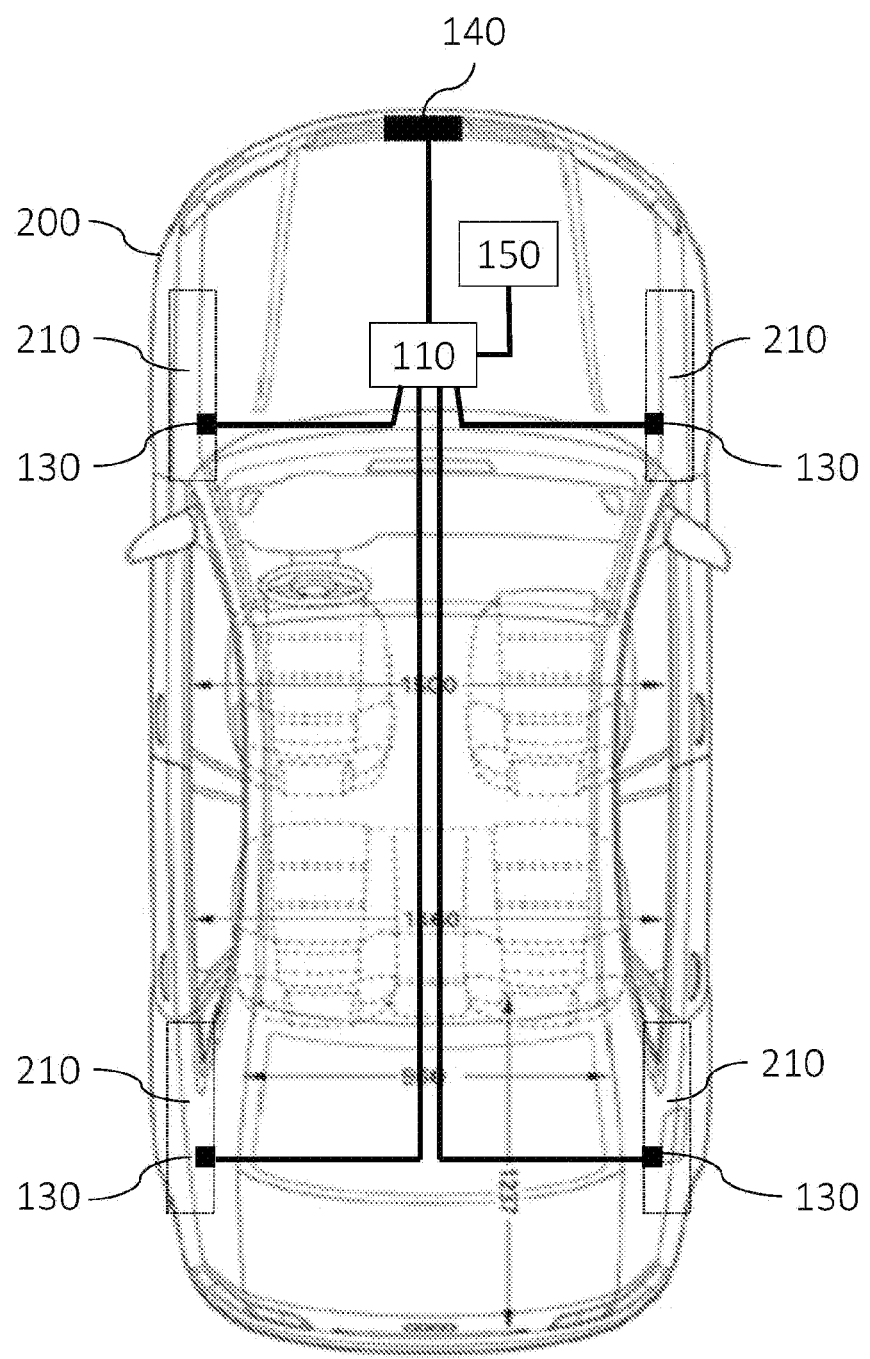
FIG. 2 schematically illustrates a vehicle, in accordance with one or more embodiments described herein.

FIG. 2 schematically illustrates a vehicle 200, in accordance with one or more embodiments described herein. The vehicle 200 may comprise a vehicle processing device 110, a forward facing camera 140 and four sensors 130. The sensors may e.g. be rotational speed sensors 130, one for each wheel 210. The signals from the sensors 130 may be transferred to the vehicle processing device 110, where the friction estimation algorithm may estimate the friction based on friction related measurements from the sensors 130. The signals from the forward facing camera 140 may be used to adapt the friction estimation algorithm. Alternatively, previously estimated friction coefficients for the road surface may be used to adapt the friction estimation algorithm. Such previously estimated friction coefficients for the road surface may e.g. be received from a central processing device 120, or from a storage device 150 in the vehicle 200.

Figure 3:
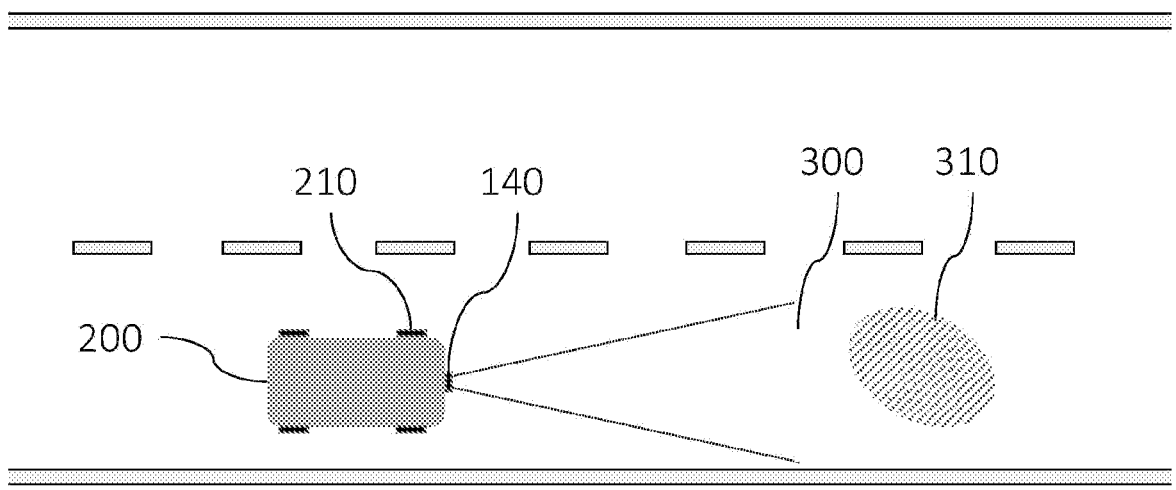
FIG. 3 schematically illustrates a vehicle travelling on a road surface, in accordance with one or more embodiments described herein.

FIG. 3 schematically illustrates a vehicle 200 travelling on a road surface 300, in accordance with one or more embodiments described herein. The vehicle 200 may comprise a forward facing camera 140, which collects image data for the road surface 300 ahead of the vehicle 200 as the vehicle 200 travels the road surface 300. The image from the camera 140 may be any type of image (visual, infrared, etc.) and collect any type of image data, including e.g. road surface temperature or sky cloudiness.

Based on this image data, an estimation of the expected friction may be made, based on e.g. information about any deviations such as e.g. oil spills 310 on the road surface 300. The estimate of the expected friction does not have to be a determined actual friction, it may simply be an indication of a potential sudden change in friction. Image processing may be required on the image data in order to provide such an indication—such image processing may e.g. take place in the vehicle processing device 110. The vehicle 200 may further comprise four wheels 210, for each of which a first sensor 130, e.g. a rotational speed sensor 130, may be arranged to make friction related measurements as the vehicle 200 travels on the road surface 300.

The at least one first sensor 130 may be any type of sensor or combination of sensors capable of making friction related measurements. Friction estimation may e.g. be affected by load changes in the vehicle 200. For determining load changes in the vehicle 200, information about e.g. the torque and the engine RPM may be needed, and this can e.g. be determined based on measurements from various engine sensors. A pressure sensor such as e.g. a barometer may be used to determine the altitude, and based on this determine whether the vehicle 200 is driving uphill or downhill. Various types of accelerometers and/or gyroscopes, e.g. in the form of an inertial measurement unit (IMU), may be used to determine e.g. yaw rate, longitudinal acceleration and vertical acceleration, to be used for determine load changes in the vehicle 200. Axle height information may e.g. be provided by sensors which are arranged in the vehicle 200 for adapting the direction of the vehicle lights. The absolute velocity may e.g. be determined using a GPS sensor, or using another velocity recognizing sensor such as a camera, a radar, an IR sensor, or a laser sensor. Information from a temperature sensor may also assist in determining friction.

The friction estimation algorithm in the vehicle processing device 110 may estimate the friction between a tire of the vehicle 200 and the road surface 300 based on friction related measurements from the at least one first sensor 130 in the vehicle. The friction estimation algorithm may be based on certain parameters, such as e.g. one or more properties of the tire of the vehicle 200, and have certain characteristics, such as a certain stability and a certain response time. The friction estimation algorithm may have been optimized in a certain way, e.g. to ensure that the algorithm consistently delivers stable and dependable friction estimations. However, it may be desirable to adapt the friction estimation algorithm so that it reacts even quicker than usual if there is a sudden onset of low friction, e.g. caused by a wet road or an oil spill 310.

As explained above, the vehicle may comprise at least one camera 140, which may e.g. be forward facing. The camera may alternatively be faced in another direction, such as e.g. rearward. Based on image data from this camera 140, an estimate of the expected friction may be made. The estimate of the expected friction may e.g. be an indication of a potential sudden change in friction, based on image data from the at least one camera 140, and the friction estimation algorithm may then be adapted in such a way that the sensitivity of the algorithm is increased. This enables the friction estimation algorithm to react quickly to potential friction changes detected before the vehicle reaches the friction change. This makes it possible for the friction estimation algorithm to always be stable and dependable, while still reacting fast when conditions change.

If the estimate of the expected friction indicates a need for adapting the friction estimation algorithm, the algorithm may be adapted based on what aspects are determined to become important. If the estimate of the expected friction e.g. is an indication of a potential sudden change in friction, a quick response time of the friction estimation algorithm may desirable, and the algorithm may then be adapted to ensure a quick response time.

Image data for the road surface 300 may be used to determine e.g. that a quick response time of the friction estimation algorithm is desirable, if the image data shows e.g. a wet road or an oil spill 310 ahead of the vehicle 200. The image data will itself not be reliable enough to estimate the actual friction, but it can be determined from the image data that there will most probably be a sudden change in friction when the vehicle 200 reaches the wet road or oil spill 310 on the road surface 300. This determination may be used to adapt the sensitivity of the friction estimation algorithm in order to ensure a quick response time of the friction estimation algorithm.

For a friction estimation system, as described e.g. in EP1558456, where a Kalman filter is used in the friction estimation algorithm, the sensitivity could e.g. be increased by increasing the process noise in the Kalman filter when the estimate of the expected friction is an indication of a potential sudden change in friction. If e.g. the at least one camera 140 detects a wet road or an oil spill, the friction estimation algorithm could thus be adapted by the process noise in the Kalman filter used in the friction estimation algorithm being increased, so that the friction estimation algorithm is more certain to react to the expected sudden change in friction.

Correspondingly, if image data for the road surface 300 indicates a dry road, the friction coefficient can be expected to be high. The adapted friction estimation algorithm may then have a decreased sensitivity and thereby e.g. ignore fluctuations in received data, so that stable and consistent results can be obtained. Fluctuations in received data may e.g. depend on potholes and/or speed bumps on the road which may cause the wheels to slip. The estimate of the expected friction may also be information about such road properties, received from the camera 140 or from other sources.

If the at least one camera 140 e.g. detects a pothole, the friction estimation algorithm could be adapted to discard the at least one friction related measurement in the position where the pothole is detected. The at least one camera 140 could thus be used to identify friction related measurements that are correlated with certain road properties that should not be taken into account for estimating the friction, so that such friction related measurements can be discarded. In this way, only correct friction related measurements are used for estimating the friction.

In another example, if the at least one camera 140 e.g. detects the road being generally rough, the friction estimation algorithm could be adapted to increase the measurement noise in the at least one friction related measurement. This stabilizes the friction estimation, so that the estimated friction becomes more consistent at times when the friction can be expected to be high.

Instead of a forward or rearward facing camera 140, other sensors such as e.g. a downward pointing laser in the vehicle 200 may also or alternatively be used to estimate the expected friction. The expected friction may also be estimated in the vehicle processing device 110 and/or in the central processing device 120 based on friction related information reported from vehicles or other sources, such as e.g. sources of weather data, or road authorities.

The vehicle processing device 110 may be arranged to receive an estimate of the expected friction between the road surface 300 and the tire of the vehicle 200 from a central processing device 120 from a storage device 150 in the vehicle 200, or from at least one second sensor 140 in the vehicle 200, such as e.g. a camera, adapt the friction estimation algorithm based on said received an estimate of the expected friction, receive at least one friction related measurement from the at least one first sensor 130 in the vehicle, and perform an estimation of the friction between the road surface 300 and the tire of the vehicle 200 based on the at least one friction related measurement, using the adapted friction estimation algorithm. This ensures that the friction estimation is optimized to the present needs, as determined based on e.g. image data from the at least one camera 140.

The at least one second sensor 140 may be any type of sensor, not necessarily a camera. The at least one second sensor 140 may e.g. be an external sensor such as radar, laser, or an IR sensor. The at least one second sensor 140 may also be e.g. a temperature sensor, a wiper speed sensor, a wet sensor, a humidity sensor, an air pressure sensor, an accelerometer, or a wheel speed sensor. The at least one second sensor 140 may also be any combination of any type of sensors, such as e.g. a camera in combination with radar.

When the estimate of the expected friction is obtained from the at least one second sensor 140, processing of the signals from the at least one second sensor 140 may be required in order to provide the estimate of the expected friction—such processing may e.g. take place in the vehicle processing device 110.

The estimate of the expected friction may also, or alternatively, be a previously estimated friction coefficient for the road surface, or a friction value received from another friction estimation algorithm. As explained above, the friction estimation algorithm may be based on certain parameters, such as one or more properties of the tire of the vehicle 200. It is sometimes challenging to calibrate a friction estimation algorithm for a specific tire of a specific vehicle 200, since this may require estimating one or more properties of the tire. The calibration process may be speeded up if a previously estimated friction coefficient for the road surface 300 can be used to calculate a preliminary value of the one or more properties of the tire of the vehicle 200 using the friction estimation algorithm, based on the assumption that the friction has not changed from the previously estimated friction coefficient. The previously estimated friction coefficient for the road surface 300 may e.g. be received from a central processing device 120, or from a storage device 150 in the vehicle 200. This enables an easy calibration of the friction estimation algorithm.

The central processing device 120 may e.g. be located on the web or in the cloud. The previously estimated friction coefficient for the road surface 300 may e.g. have been estimated by other vehicles travelling on the same road surface 300 and reporting to the central processing device 120, or estimated in the central processing device 120 based on friction related information reported from vehicles or other sources, such as e.g. sources of weather data, or road authorities. Such previously estimated friction coefficients may be stored locally in a storage device 150 in the vehicle 200.

Figure 4:
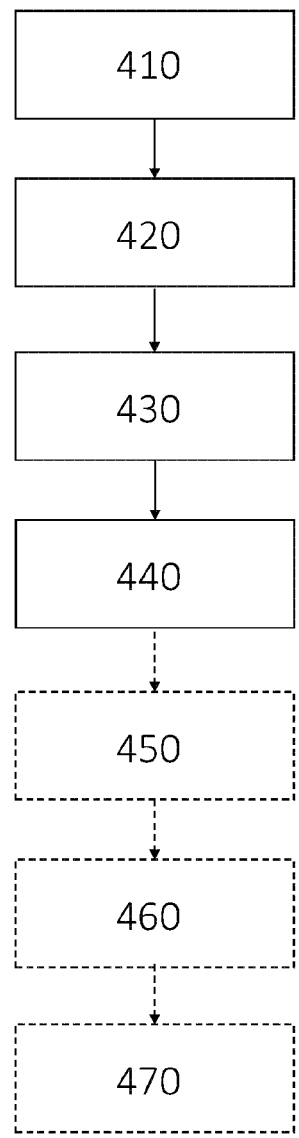
FIG. 4 schematically illustrates a method for estimating the friction between a road surface and a tire of a vehicle, in accordance with one or more embodiments described herein.

FIG. 4 schematically illustrates a method 400 for estimating the friction between a road surface 300 and a tire of a vehicle 200 comprising at least one first sensor 130 and at least one vehicle processing device 110 containing a friction estimation algorithm which is arranged to estimate the friction between the road surface and the tire of the vehicle based on friction related measurements. The method 400 may comprise:

Step 410: obtaining an estimate of the expected friction between the road surface 300 and the tire of the vehicle 200. The estimate may e.g. be obtained from a central processing device 120, from a storage device 150 in the vehicle 200, or from at least one second sensor 140 in the vehicle 200, such as e.g. a camera.

Step 420: adapting the friction estimation algorithm based on said obtained estimate of the expected friction.

Step 430: performing at least one friction related measurement using the at least one first sensor 130.

Step 440: using the adapted friction estimation algorithm to perform an estimation of the friction between the road surface 300 and the tire of the vehicle 200 based on the at least one friction related measurement.

In embodiments, the vehicle 200 further comprises at least one camera 140, which may e.g. be forward facing, and said obtained estimate of the expected friction is based on image data from the at least one camera 140.

The obtained estimate of the expected friction may e.g. be an indication of a potential sudden change in friction, e.g. based on image data from the at least one camera 140, and the friction estimation algorithm be adapted in such a way that the sensitivity of the algorithm is increased. When the estimate of the expected friction is obtained from the at least one camera 140, image processing of the image data may be required in order to provide the estimate of the expected friction—such image processing may e.g. take place in the vehicle processing device 110.

In embodiments, the method 400 further comprises:

Step 450: determining the point in time when the vehicle 200 is expected to reach the position on the road surface 300 for which a potential sudden change in friction is indicated, e.g. based on images from the at least one camera 140.

Step 460: increasing the sensitivity of the friction estimation algorithm at this point in time.

If the obtained estimate of the expected friction is an indication of no change in friction, e.g. based on image data from the at least one camera 140, the sensitivity of the friction estimation algorithm may be decreased, so that any fluctuations in the at least one friction related measurement may be ignored.

In embodiments, the obtained estimate of the expected friction is a previously estimated friction coefficient for the road surface 300. The previously estimated friction coefficient for the road surface 300 may e.g. be received/obtained from a central processing device 120.

In embodiments, the method 400 further comprises:

Step 470: determining at least one parameter of the friction estimation algorithm based on the previously estimated friction coefficient for the road surface 300.

The determining 470 may e.g. involve calculating a preliminary value of a property of the tire of the vehicle 200 based on the assumption that the friction coefficient has not changed from the previously estimated friction coefficient for the road surface 300.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

The invention claimed is:

1. A system for estimating the friction between a road surface and a tire of a vehicle comprising:
   at least one first sensor; and
   at least one vehicle processing device containing a friction estimation algorithm which is arranged to estimate a friction coefficient representing the friction between the road surface and the tire of the vehicle based on friction related measurements, wherein the vehicle processing device is arranged to:
   receive from a central processing device or from a storage device in the vehicle a friction coefficient for the road surface previously estimated using the friction estimation algorithm;

calculate a value of one or more parameters of the friction estimation algorithm using the friction estimation algorithm based on said previously estimated friction coefficient;

receive at least one friction related measurement from the at least one first sensor in the vehicle; and use the calculated value in the friction estimation algorithm to perform an estimation of the friction between the road surface and the tire of the vehicle based on the at least one friction related measurement.

2. The system according to claim 1, wherein, if said received previously estimated friction coefficient indicates a potential sudden change in friction, the vehicle processing device is arranged to increase the sensitivity of the friction estimation algorithm.

3. The system according to claim 1, wherein, if said received previously estimated friction coefficient indicates a potential sudden change in friction, the vehicle processing device is arranged to:

determine the point in time when the vehicle is expected to reach the position on the road surface for which said potential sudden change in friction is indicated; and increase the sensitivity of the friction estimation algorithm at this point in time.

4. The system according to claim 1, wherein, if said received previously estimated friction coefficient indicates no change in friction, the vehicle processing device is arranged to decrease the sensitivity of the friction estimation algorithm.

5. The system according to claim 1, wherein the previously estimated friction coefficient is received from the central processing device.

6. The system according to claim 1, wherein the vehicle processing device is further arranged to determine at least one parameter of the friction estimation algorithm based on said received previously estimated friction coefficient.

7. The system according to claim 6, wherein the vehicle processing device is arranged to calculate a preliminary value of a property of the tire of the vehicle based on the assumption that the friction coefficient has not changed from said received previously estimated friction coefficient.

8. A method for estimating the friction between a road surface and a tire of a vehicle comprising at least one first sensor and at least one vehicle processing device containing a friction estimation algorithm which is arranged to estimate a friction coefficient representing the friction between the road surface and the tire of the vehicle based on friction related measurements, the method comprising:

obtaining from a central processing device or from a storage device in the vehicle a friction coefficient for the road surface previously estimated using the friction estimation algorithm;

calculating a value of one or more parameters of the friction estimation algorithm using the friction estimation algorithm based on said previously estimated friction coefficient;

performing at least one friction related measurement using the at least one first sensor in the vehicle; and using the calculated value in the friction estimation algorithm to perform an estimation of the friction between the road surface and the tire of the vehicle based on the at least one friction related measurement.

9. The method according to claim 8, wherein, if said obtained previously estimated friction coefficient indicates a potential sudden change in friction, the method further comprises increasing the sensitivity of the friction estimation algorithm.

10. The method according to claim 8, wherein, if said obtained previously estimated friction coefficient indicates a potential sudden change in friction, the method further comprises:

determining the point in time when the vehicle is expected to reach the position on the road surface for which said potential sudden change in friction is indicated; and increasing the sensitivity of the friction estimation algorithm at this point in time.

11. The method according to claim 8, wherein, if said obtained previously estimated friction coefficient indicates no change in friction, the method further comprises decreasing the sensitivity of the friction estimation algorithm.

12. The method according to claim 8, wherein said previously estimated friction coefficient is obtained from the central processing device.

13. The method according to claim 8, further comprising determining at least one parameter of the friction estimation algorithm based on said obtained previously estimated friction coefficient.

14. The method according to claim 13, wherein the determining at least one parameter of the friction estimation involves calculating a preliminary value of a property of the tire of the vehicle based on the assumption that the friction coefficient has not changed from said obtained previously estimated friction coefficient.

15. A system for estimating the friction between a road surface and a tire of a vehicle comprising:

at least one first sensor; and at least one vehicle processing device containing a friction estimation algorithm which is arranged to estimate the friction between the road surface and the tire of the vehicle based on friction related measurements, wherein the vehicle processing device is arranged to:

receive a previously estimated friction coefficient between the road surface and the tire of the vehicle from a central processing device or from a storage device in the vehicle;

adapt the friction estimation algorithm based on said previously estimated friction coefficient;

receive at least one friction related measurement from the at least one first sensor in the vehicle; and use the adapted friction estimation algorithm to perform an estimation of the friction between the road surface and the tire of the vehicle based on the at least one friction related measurement, wherein the vehicle processing device is further arranged to determine at least one parameter of the friction estimation algorithm based on said received previously estimated friction coefficient, and wherein the vehicle processing device is arranged to calculate a preliminary value of a property of the tire of the vehicle based on the assumption that the friction coefficient has not changed from said received previously estimated friction coefficient.

16. A method for estimating the friction between a road surface and a tire of a vehicle comprising at least one first sensor and at least one vehicle processing device containing a friction estimation algorithm which is arranged to estimate the friction between the road surface and the tire of the vehicle based on friction related measurements, the method comprising:

obtaining a previously estimated friction coefficient between the road surface and the tire of the vehicle from a central processing device or from a storage device in the vehicle;

adapting the friction estimation algorithm based on said previously estimated friction coefficient;
performing at least one friction related measurement using the at least one first sensor in the vehicle; and
using the adapted friction estimation algorithm to perform an estimation of the friction between the road surface and the tire of the vehicle based on the at least one friction related measurement,
wherein the method further comprises determining at least one parameter of the friction estimation algorithm based on said obtained previously estimated friction coefficient, and
wherein determining at least one parameter of the friction estimation algorithm involves calculating a preliminary value of a property of the tire of the vehicle based on the assumption that the friction coefficient has not changed from said obtained previously estimated friction coefficient.

\* \* \* \* \*